United States Patent
Park et al.

(10) Patent No.: US 10,181,931 B2
(45) Date of Patent: Jan. 15, 2019

(54) METHOD FOR UPLINK CONTROL CHANNEL RESOURCE ALLOCATION OF TERMINAL AND APPARATUS THEREOF

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 39 days.

(21) Appl. No.: 15/025,262

(22) PCT Filed: Sep. 22, 2014

(86) PCT No.: PCT/KR2014/008765
§ 371 (c)(1),
(2) Date: Mar. 25, 2016

(87) PCT Pub. No.: WO2015/046831
PCT Pub. Date: Apr. 2, 2015

(65) Prior Publication Data
US 2016/0242169 A1    Aug. 18, 2016

(30) Foreign Application Priority Data

Sep. 27, 2013 (KR) .................. 10-2013-0115367
May 14, 2014 (KR) .................. 10-2014-0057938

(51) Int. Cl.
*H04W 4/70* (2018.01)
*H04W 72/12* (2009.01)
*H04L 1/18* (2006.01)

(52) U.S. Cl.
CPC .......... *H04L 1/1812* (2013.01); *H04L 1/1861* (2013.01); *H04W 4/70* (2018.02); *H04L 1/189* (2013.01); *H04W 72/1289* (2013.01)

(58) Field of Classification Search
CPC .......... H04W 72/1268; H04W 72/1284; H04W 72/004
See application file for complete search history.

(56) References Cited

U.S. PATENT DOCUMENTS

| | | | |
|---|---|---|---|
| 2013/0155974 A1* | 6/2013 | Papasakellariou | H04W 72/042 370/329 |
| 2013/0250882 A1* | 9/2013 | Dinan | H04W 72/0426 370/329 |
| 2013/0315159 A1* | 11/2013 | Xia | H04W 72/042 370/329 |

(Continued)

FOREIGN PATENT DOCUMENTS

WO    2013/015637 A2    1/2013

OTHER PUBLICATIONS

Author Unknown, Backwards compatible support for reduced bandwidth MTC LTE, 3GPP TSG RAN WG1 Meeting #67, Doc. No. R1-114268, Nov. 18, 2011, pp. 1-4.*

(Continued)

*Primary Examiner* — Christopher M Crutchfield
(74) *Attorney, Agent, or Firm* — IP Legal Services, LLC

(57) ABSTRACT

Provided are a method and an apparatus for PUCCH resource allocation for an uplink HARQ ACK/NACK feedback of a machine-type communication (MTC) terminal in a 3GPP LTE/LTE-Advanced system.

7 Claims, 10 Drawing Sheets

(56) References Cited

U.S. PATENT DOCUMENTS

2014/0169319 A1 6/2014 Yang et al.
2017/0180098 A1* 6/2017 You .................... H04L 5/0055

OTHER PUBLICATIONS

Author Unknown, Text proposal on PUCCH coverage improvement for Section 9.5.5 of TR 36.888, 3GPP TSG-RAN WG1 Meeting #72bis, Doc. No. R1-131825, Apr. 19, 2013, pp. 1-2.*
Author Unknown, Coverage enhancement of DL/UL control channels for low cost MTC, 3GPP TSG-RAN WG1 #74bis, Doc. No. R1-134131, Oct. 11, 2013, pp. 1-10.*
3GPP TS 36.213 V11.4.0, "3rd Generation Partnership Project; Technical Specification Group Radio Access Network; Evolved Universal Terrestrial Radio Access (E-UTRA); Physical layer procedures (Release 11)", Sep. 20, 2013.
HTC, "Remaining issues on PUCCH A/N resource allocation for EPDCCH", R1-124356, 3GPP TSG RAN WG1 #70bis, San Diego, USA, Oct. 8-12, 2012.
Catt, "DPUCCH resource for E-PDCCH", R1-124107, 3GPP TSG RAN WG1 Meeting #70bis, San Diego, USA, Oct. 8-12, 2012.
Texas Instruments, "Outstanding aspects of PUCCH resource allocation for EPDCCH", R1-124141, 3GPP TSG RAN WG1 #70bis, San Diego, USA, Oct. 8-12, 2012.

* cited by examiner

METHOD FOR UPLINK CONTROL CHANNEL RESOURCE ALLOCATION OF TERMINAL AND APPARATUS THEREOF

CROSS REFERENCE TO RELATED APPLICATIONS

This application is a National Stage Patent Application of PCT International Patent Application No. PCT/KR 2014/008765 (filed on Sep. 22, 2014 ) under 35 U.S.C. § 371 , which claims priority to Korean Patent Application Nos. 10-2013-0115367 (filed on Sep. 27, 2013 ) and 10-2014-0057938 (filed on May. 14, 2014 ), the teachings of which are incorporated herein in their entireties by reference.

TECHNICAL FIELD

The present disclosure relates to a method and an apparatus for allocating resources of an uplink control channel for uplink Hybrid Automatic Repeat Request (HARQ) ACK/NACK feedback of an Machine Type Communication (MTC) terminal in a wireless communication system.

BACKGROUND ART

Machine type communication (hereinafter, referred to as "MTC") is a type of data communication in which one or more machines or objects communicate with each other (e.g., machine to machine) without human interaction. The MTC communication does not require human interaction. The MTC refers to all communication systems that perform communication without a human's intervention.

The MTC terminals may be installed in an area where a radio wave environment is not good compared to general terminals. In order for the MTC terminal to operate in such an area where the radio wave environment is not good compared to the general terminal, control information and/or data of each physical channel, which is transmitted in a single frame unit, may be required to be repeatedly transmitted in a plurality of subframes.

Meanwhile, a resource of an uplink control channel, in which response information of downlink data is transmitted, may be determined by a function of a resource of a downlink control channel for scheduling downlink data. However, when control information is repeatedly transmitted in order to improve control information reception performance of a MTC terminal as described above, i) how to determine resources of an uplink control channel for the MTC terminal may be uncertain, and ii) the resources of the uplink control channel for the MTC terminal may conflict with resources of an uplink control channel for a typical terminal.

DETAILED DESCRIPTION OF THE INVENTION

Technical Problem

In order to overcome the problems above, in accordance with at least one embodiment of the present disclosure, a method and an apparatus may be provided for allocating resources of an uplink control channel for a MTC terminal.

Technical Solution

In accordance with at least one embodiment of the present disclosure, a method may be provided for transmitting response information of downlink data of a Machine Type Communication (MTC) terminal. The method may include: receiving structural information that contains at least one piece of i) information on a resource allocated to an uplink control channel for transmitting the response information and ii) offset information of the resource allocated to the uplink control channel; receiving downlink control information for scheduling the downlink data; receiving the downlink data; and transmitting the response information on the downlink data by using the resource of the uplink control channel. The resource of the uplink control channel is determined based on at least one piece of i) information on a resource of a downlink control channel for scheduling the downlink data, ii) the information on the resource allocated to the uplink control channel, and iii) the offset information on the resource allocated to the uplink control channel.

In accordance with another embodiment of the present disclosure, a method may be provided for configuring a resource of response information of downlink data of a Machine Type Communication (MTC) terminal in the base station. The method may include transmitting structural information that contains at least one piece of i) information on a resource allocated to an uplink control channel for transmitting the response information and ii) offset information of the resource allocated to the uplink control channel; transmitting downlink control information for scheduling the downlink data; and transmitting the downlink data, wherein the resource of the uplink control channel for transmitting the response information of the downlink data is determined based on at least one piece of i) information on the resource of a downlink control channel for scheduling the downlink data, ii) the information on the resource allocated to which the uplink control channel, and iii) the offset information of the resource allocated to the uplink control channel.

In accordance with still another embodiment of the present disclosure, a terminal may be provided for transmitting response information of downlink data to a base station. The terminal may include: a receiving unit, a controller, and a transmitting unit. That the receiving unit is configured to receive structural information, downlink control information for scheduling the downlink data, and the downlink data. The structure information contains at least one piece of i) information on the resource allocated to an uplink control channel for transmitting the response information and ii) offset information on the resource allocated to the uplink control channel. The controller is configured to determine a resource of the uplink control channel for transmitting the response information of the downlink data based on at least one piece of i) information on the resource of a downlink control channel for scheduling the downlink data, ii) the information on the resource allocated to the uplink control channel, and iii) the offset information of the resource allocated to the uplink control channel. The transmitting unit is configured to transmit the response information on the downlink data by using the determined resource of the uplink control channel.

In accordance with yet another embodiment of the present disclosure, a base station may be provided for configuring a resource of transmitting response information of downlink data for a Machine Type Communication (MTC) terminal. The base station may include a transmitting unit configured to transmit structural information, downlink control information for scheduling the downlink data, and the downlink data. The structure information contains at least one piece of i) information on the resource allocated to an uplink control channel for transmitting the response information and ii) offset information of the resource allocated to the uplink control channel. The resource of the uplink control channel for transmitting the response information of the downlink data is determined based on at least one piece of i) information on a resource of a downlink control channel for scheduling the downlink data, ii) the information on the resource allocated to the uplink control channel, and iii) the offset information on the resource allocated to which the uplink control channel.

Advantageous Effects

According to the present disclosure as described above, a method and an apparatus may be provided for allocating resources of an uplink control channel for a MTC terminal.

MODE FOR CARRYING OUT THE INVENTION

Figure 1:
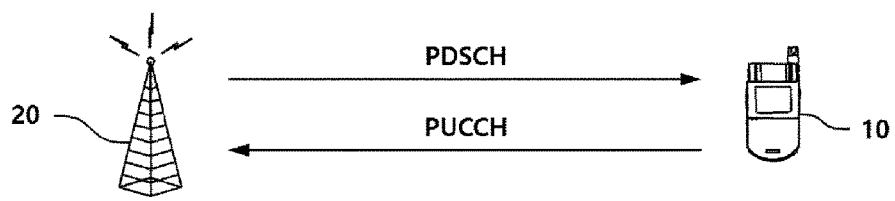
FIG. 1 illustrates an example of a wireless communication system to which an embodiment of the present disclosure is applied.

Hereinafter, some embodiments of the present disclosure will be described in detail with reference to the accompanying drawings. It should be noted that the same reference numerals denote the same elements even in different drawings. In addition, the description of the related well-known elements or functions, which may obscure the subject matter of the present disclosure, will be omitted in the present specification.

In the present specification, a MTC terminal may refer to a terminal that supports a low cost (or low complexity), or a terminal that supports coverage enhancement. Alternatively, in the present specification, the MTC terminal may refer to a terminal that is defined as a specific category to support a low cost (or low complexity) and/or coverage enhancement.

In other words, the MTC terminal may refer to the 3GPP Release-13 low cost (or low complexity) UE Category/type of device that is newly defined to perform LTE-based and MTC-related operations. Alternatively, in the present specification, the MTC terminal may refer to: a terminal that supports the improved coverage compared to the conventional LTE coverage; the UE category/type of device that is defined in the conventional 3GPP Release-12 or less, which supports low power consumption; or the 3GPP Release-13 low cost (or low complexity) UE Category/type of device that is newly defined.

FIG. 1 illustrates a wireless communication system to which an embodiment of the present disclosure is applied.

In accordance with at least one embodiment, the wireless communication system may be widely deployed to provide various types of communication services, such as voice calls, packet data, or the like. The wireless communication system includes a user equipment (UE) 10 and a base station (BS or eNB) 20. The user equipment in the present specification has a wide concept that refers to a terminal in the wireless communication and shall be interpreted as a concept containing an Mobile Station (MS), a User Terminal (UT), an Subscriber Station (SS), or wireless devices in the global systems for mobile communication (GSM), as well as the User Equipment (UE) in the wideband code division multiple access (WCDMA), long term evolution (LTE), or high speed packet access (HSPA).

The base station 20 or a cell generally denotes a station that communicates with the user equipment 10, and may be referred to as a Node-B, an eNB (evolved Node-B), a sector, a site, a BTS (Base Transceiver System), an AP, a relay node, an RRH (Remote Radio Head), an RU (Radio Unit), or a small cell as well.

That is, the base station or the cell in the present disclosure should be interpreted as having a broad meaning that represents a partial area or function, which is covered by a Base Station Controller (BSC) in the CDMA, the Node B in the WCDMA, or the eNB or sector in the LTE, and may encompass various coverage areas, such as a mega cell, a macro cell, a micro cell, a pico cell, a femto cell, a relay node, the remote radio head (RRH), the radio unit (RU), or the small cell communication range.

The base stations are provided to control the various cells described above, and the base station may be interpreted as two meanings that contain:

i) devices that provide the mega cell, the macro cell, the microcell, the pico cell, the femto cell, or the small cell in relation to the wireless area; or ii) the wireless area itself.

With regard to i), the devices that provide a specific wireless area and are controlled by the same object, or all devices that cooperate with each other to form the wireless area, may be referred to as the base station. The eNB, the RRH, antennas, the RU, LPN, points, transmission/reception points, transmission points, or reception points may be an example of the base station depending on the configuration of the wireless area. With regard to ii), the wireless area, in which the user equipment or a nearby base station receives/transmits signals, may be referred to as the base station.

Therefore, the mega cell, the macro cell, the micro cell, the pico cell, the femto cell, the small cell, the RRH, the antenna, the RU, the Low Power Node (LPN), the point, the eNB, the transmission/reception point, the transmission point, and the reception point may be collectively referred to as the base station.

In the present specification, the user equipment and the base station have a generic meaning as being the uplink device and the downlink device, which are used to implement the technology or technical concept described herein, and the user equipment and the base station are not limited to a specific term or word. The user equipment and the base station have a generic meaning as the uplink device and the downlink device, which are used to implement the technology or technical concept described herein, and the user equipment and the base station are not limited to a specific term or word. Here, the uplink (UL) means a method in which the user equipment transmits and receives data to and from the base station, and the downlink (DL) means a method in which the base station transmits and receives data to and from the user equipment.

Multiple access schemes applied to the wireless communication system are not limited. A variety of multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, or OFDM-CDMA, may be used. An embodiment of the present disclosure may be applied to the resource allocation of asynchronous wireless communications that have advanced from the GSM, the WCDMA, and the HSPA to the LTE and the LTE-Advanced, and synchronous wireless communications that have advanced to the CDMA, the CDMA-2000, and the UMB. The present disclosure should not be interpreted to be limited to a specific wireless communication, and should be construed to include all schemes to which the technical concept of the present disclosure may be applied.

The uplink transmission and the downlink transmission may use a TDD (Time Division Duplex) scheme in which the data is transmitted at a different time, or may use an FDD (Frequency Division Duplex) scheme in which the data is transmitted by using different frequencies.

In addition, the uplink and downlink may be configured as a standard based on a single carrier or a pair of carriers in the LTE or LTE-Advanced scheme. The uplink and downlink transmit control information through control channels, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), or an EPD-CCH (Enhanced Physical Downlink Control CHannel), and transmit data by means of data channels, such as a PDSCH (Physical Downlink Shared CHannel) or a PUSCH (Physical Uplink Shared CHannel).

Meanwhile, the control information may be transmitted by means of the EPDCCH (enhanced PDCCH or extended PDCCH) as well.

In the present specification, the cell may refer to: the coverage of a signal that is transmitted from the transmission/reception point; a component carrier that has the coverage of a signal that is transmitted from the transmission point or transmission/reception point; or the transmission/reception point itself.

The wireless communication system, to which the embodiments are applied, may be a coordinated multi-point transmission/reception system (CoMP system) in which two or more transmission/reception points cooperate with each other to transmit signals, a coordinated multi-antenna transmission system, or a coordinated multi-cell communication system. The CoMP system may include two or more multi-transmission/reception points and terminals.

The multi-transmission/reception point may be: the base station or the macro cell (hereinafter, referred to as 'eNB'); or one or more RRHs that are connected with the eNB through optical cables or optical fibers to be wiredly controlled, and that have a high transmission power or have a low transmission power within the macro cell area.

Hereinafter, the downlink refers to the communication or the communication path from the multi-transmission/reception point to the terminal, and the uplink refers to the communication or the communication path from the terminal to the multi-transmission/reception point. In the downlink, a transmitter may be a part of the multi-transmission/reception point, and a receiver may be a part of the terminal. In the uplink, a transmitter may be a part of the terminal, and a receiver may be a part of the multi-transmission/reception point.

Hereinafter, the state in which the signals are transmitted/received through the channels, such as the PUCCH, the PUSCH, the PDCCH, the EPDCCH, or the PDSCH, may be expressed as "transmitting/receiving the PUCCH, the PUSCH, the PDCCH, the EPDCCH, or the PDSCH."

In addition, the transmitting/receiving of the PDCCH or the transmitting/receiving of signals through the PDCCH may include the transmitting/receiving of the EPDCCH or the transmitting/receiving of signals through the EPDCCH.

In other words, the physical downlink control channel described below may refer to the PDCCH, the EPDCCH, or both the PDCCH and the EPDCCH.

In addition, for the convenience of explanation, the description of the PDCCH may be applied to the embodiment of the EPDCCH, and the description of the EPDCCH may be applied to the embodiment of the PDCCH.

Meanwhile, the higher layer signaling described below includes the RRC signaling to transmit RRC information that contains an RRC parameter.

The base station 20 performs the downlink transmission to the terminal 10. The base station 20 may transmit i) a physical downlink shared channel (PDSCH), which is a main physical channel for unicast transmission and ii) a physical downlink control channel (PDCCH) for transmitting the downlink control information, such as scheduling information necessary for the reception of the PDSCH and scheduling grant information for the transmission in the uplink data channel {e.g., a physical uplink shared channel (PUSCH)}. Hereinafter, the transmission/reception of signals through each channel will be expressed as the transmission/reception of the corresponding channel.

In the typical 3GPP LTE/LTE-Advanced system, the PUCCH resource mapping for the Hybrid Automatic Repeat Request (HARQ) ACK/NACK feedback with respect to the reception of the scheduled PDSCH through the legacy PDCCH of the terminal is determined by an upper layer {e.g. Radio Resource Control (RRC)} parameter and a Control Channel Element (CCE) index in which the corresponding downlink (DL) assignment Downlink Control Information (DCI) is transmitted as shown in Equation (1) and Equation (2) below.

$$n_{PUCCH}^{(1,\tilde{p}0)} = n_{CCE} + N_{PUCCH}^{(1)} \quad (1)$$

$$n_{PUCCH}^{(1,\tilde{p}1)} = n_{CCE} + 1 + N_{PUCCH}^{(1)} \quad (2)$$

Equation (1) and Equation (2) represent the PUCCH resource $n_{PUCCH}^{(1,\tilde{p})}$ for the HARQ ACK/NACK feedback in the antenna port 0 and the antenna port 1, respectively, in the terminal that supports two antenna ports. $n_{CCE}$ denotes a lowest CCE index value in which the corresponding DL scheduling grant is transmitted, and $N_{PUCCH}^{(1)}$ denotes a cell-specific parameter that is configured by the higher layer (RRC) signaling.

However, the PUCCH resource mapping scheme by Equation (1) and Equation (2) is for the transmission of the HARQ ACK/NACK through the PUCCH format 1a/1b of the terminal for which a single serving cell is configured in the frame structure type 1 (FDD) system. Additionally, the PUCCH resource mapping rule about the terminal for which one or more serving cells are configured (i.e., the terminal to which carrier aggregation is applied) may be, similar to the scheme above, determined by a function of the lowest CCE index and the higher layer parameter, or may be determined by the ARI (ACK/NACK Resource Indication) scheme in which a plurality of candidate PUCCH resource values are pre-configured through the higher layer signaling and the PUCCH resources to be used are indicated among the plurality of candidate PUCCH resource values by means of a 'TPC command for PUCCH' information area of the actual DL scheduling grant.

<Improvement of Coverage for Low-cost MTC>

It is assumed that the MTC terminal is a low capability terminal that has low performance hardware and software compared with a typical LTE/LTE-Advanced terminal in order to reduce a unit price of a terminal. Accordingly, the transmission/reception performance of the MTC terminal with respect to the physical layer channels, which are designed based on the UE category of the existing LTE/LTE-Advanced terminal and the UE capability thereof, is expected to be deteriorated, so studies have been actively made for developing method to improve the transmission/reception performance for the corresponding physical layer channels in order to solve the problem above.

To this end, a typical method is provided, in which the power boosting with respect to the corresponding physical layer channel and the repeated transmission through a plurality of subframes are performed. For example, in order to transmit a single DCI (Downlink Control Information) for the MTC terminal, the PDCCH, which is a downlink control channel, is repeatedly transmitted through a plurality of downlink subframes in order to thereby obtain the power gain. Likewise, a method is considered, in which the PDSCH is repeatedly transmitted through a plurality of downlink subframes in order to thereby improve the reception performance of the MTC terminal.

In the existing system of LTE/LTE-Advanced Release-11 or less, the DL assignment information for the reception of the PDSCH, which is a downlink data channel of a certain terminal, is transmitted through only the PDCCH of the same downlink subframe, except for the SPS (Semi-Persistent Scheduling). Thus, the PUCCH resource allocation rule for the uplink HARQ ACK/NACK transmission with respect to the reception of the corresponding PDSCH is determined by a function of the lowest CCE (Control Channel Element) in which the corresponding downlink allocation PDCCH or EPDCCH is transmitted. Accordingly, this can prevent a collision between the PUCCH resources by which each terminal transmits the HARQ ACK/NACK with respect to the PDSCH transmissions for different terminals, which are transmitted through the same downlink subframe. However, if the PDCCH for transmitting a single DCI is repeatedly transmitted through a plurality of downlink subframes in order to improve the PDCCH reception performance of the MTC terminal as described above, it may bring about an uncertainty for the definition of the CCE index value to be applied to the lowest CCE index. Furthermore, the repeated transmission of the PDSCH and the PUCCH of the terminal through the plurality of subframes may cause a collision between the PUCCH resource of the MTC terminal and the PUCCH resource for the HARQ ACK/NAKC feedback of a general LTE terminal other than the MTC terminal.

In accordance with at least one embodiment of the present disclosure, a method and an apparatus may be provided for allocating the PUCCH resource for the uplink HARQ ACK/NACK feedback of the MTC terminal.

Embodiment 1. Reuse of PUCCH Resource Mapping Equation

Definition of New PUCCH Resource Start Offset

Figure 2:
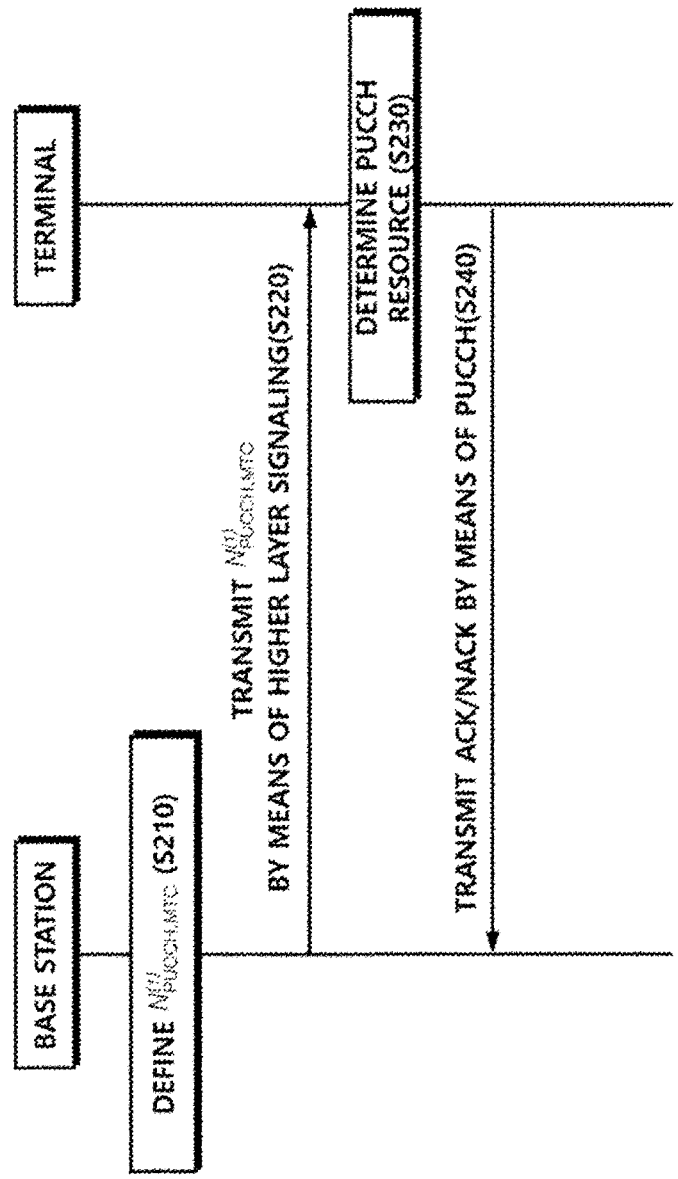
FIG. 2 is a flowchart illustrating an exemplary method according to a first embodiment of the present disclosure.

FIG. 2 is a flowchart illustrating an exemplary method according to a first embodiment.

Referring to FIG. 2, the base station defines a separate PUCCH resource start offset parameter $N_{PUCCH\text{-}MTC}^{(1)}$ for the MTC terminal (S210). The base station includes the same in the corresponding RRC signaling and transmits the corresponding RRC signal to the terminal (S220). According to this, the MTC terminal determines the PUCCH resource by replacing $N_{PUCCH}^{(1)}$ with $N_{PUCCH\text{-}MTC}^{(1)}$ in the PUCCH resource mapping equations (1) and (2) above (S230), and the MTC terminal transmits the HARQ ACK/NACK to the base station through the determined PUCCH resource (S240). That is, the MTC terminal may apply Equation (3) and Equation (4) as follows.

$$n_{PUCCH}^{(1,\tilde{p}0)} = n_{CCE} + N_{PUCCH,MTC}^{(1)} \quad (3)$$

$$n_{PUCCH}^{(1,\tilde{p}1)} = n_{CCE} + 1 + N_{PUCCH,MTC}^{(1)} \quad (4)$$

The $N_{PUCCH,MTC}^{(1)}$ value may be configured for each MTC terminal by the UE-specific RRC signaling. According to another embodiment for signaling the $N_{PUCCH,MTC}^{(1)}$ value, the $N_{PUCCH,MTC}^{(1)}$ value may be broadcast to the MTC terminal in the corresponding cell through the cell-specific RRC signaling or the PBCH for the MTC terminal.

Figure 3:
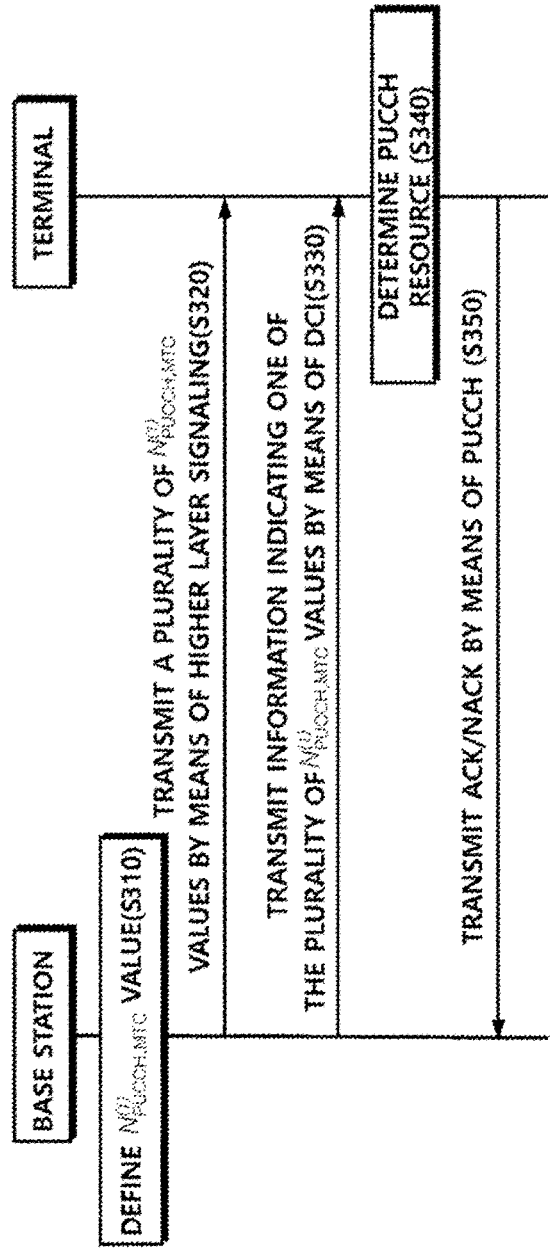
FIG. 3 is a flowchart illustrating another exemplary method according to the first embodiment of the present disclosure.

FIG. 3 is a flowchart illustrating another exemplary method according to the first embodiment.

Referring to FIG. 3, as another exemplary method for configuring a separate PUCCH resource start offset value for the MTC terminal, the base station may: define a plurality of candidate PUCCH resource start offset values for each MTC terminal through the higher layer RRC signaling (S310); transmit the plurality of candidate PUCCH resource start offset values to the terminal (S320); and control to provide the terminal with a signal of the PUCCH resource start offset value that is to be applied when allocating the PDSCH resource (S330). The terminal determines the resource of the PUCCH by using Equation (3) and Equation (4) (S340), and the terminal transmits the HARQ ACK/NACK to the base station through the PUCCH of the determined resource (S350).

That is, the base station may provide the UE-specific RRC signaling or cell-specific RRC signaling for a certain MTC terminal. Or, the base station may signal the candidate PUCCH resource start offset parameter by the PBCH for the MTC terminal and may indicate the PUCCH resource start offset parameter to be applied through the downlink allocation DCI format for the MTC terminal. A method may be provided, in which a PUCCH resource start offset indicator information area is explicitly defined in the downlink allocation DCI format in order to indicate the PUCCH resource start offset, or it may be explicitly indicated by using the existing information area.

For example, four candidate PUCCH resource start offset parameters $N_{PUCCH,MTC1}^{(1)}$, $N_{PUCCH,MTC2}^{(1)}$, $N_{PUCCH,MTC3}^{(1)}$, $N_{PUCCH,MTC4}^{(1)}$ for the MTC terminal are configured, and the information area of 2 bits for indicating the corresponding PUCCH resource start offset is newly defined in the downlink allocation DCI format in order to thereby indicate the PUCCH resource start offset to be applied to the PUCCH resource mapping equations (3) and (4) through the same. Alternatively, the existing information area, such as a TPC command, may be used to indicate the corresponding PUCCH resource start offset without additionally defining a new information area.

In another method, the value to be applied among the corresponding candidate PUCCH resource start offset may be implicitly informed of. For example, the applied PUCCH resource start offset value may be determined according to the number of PDCCH repetitions for transmitting the corresponding DCI (that is, the PDCCH aggregation level or repetition level).

Definition of Lowest CCE Index for Repeated PDCCH

Figure 4:
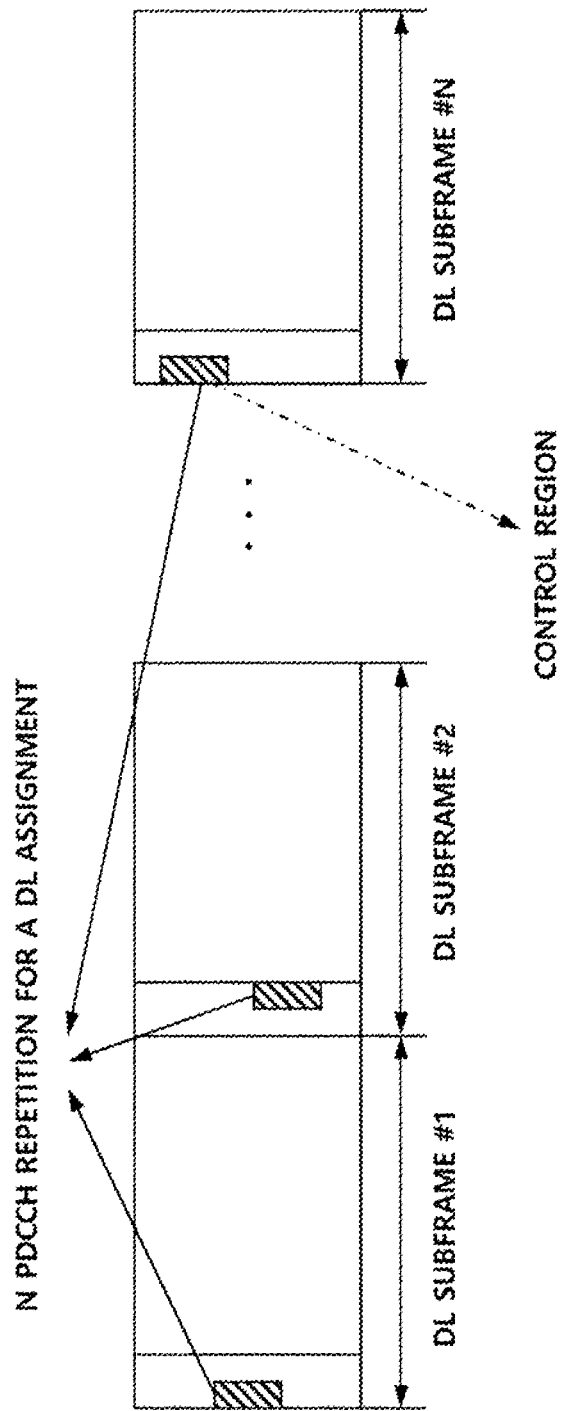
FIG. 4 is a diagram showing that a PDCCH is repeatedly transmitted through a plurality of downlink subframes according to an embodiment of the present disclosure.

FIG. 4 is a view showing that a PDCCH is repeatedly transmitted through a plurality of downlink subframes according to an embodiment of the present disclosure.

The PDCCH may be defined to be repeatedly transmitted through a plurality of downlink subframes in order to improve the DCI reception performance of the MTC terminal as shown in FIG. 4.

In this case, the lowest CCE index $n_{CCE}$ should be defined in order to be applied to the equations (3) and (4) above. To this end, in accordance with at least one embodiment of the present disclosure, the $n_{CCE}$ value may be defined to be applied to the PUCCH resource mapping equations (3) and (4) when the downlink allocation DCI for a certain MTC terminal is repeatedly transmitted through the PDCCHs of a plurality of downlink subframes.

In the first embodiment, when the N PDCCHs are repeatedly used for transmitting a single downlink allocation DCI as shown in FIG. 4, the lowest CCE index among the CCEs that are used for the transmission of the first PDCCH may be defined as the corresponding $n_{CCE}$ value. In another embodiment, the lowest CCE index of the $N^{th}$ PDCCH, which is the last repeated PDCCH, may be defined as the corresponding $n_{CCE}$ value. Lastly, the smallest CCE index among the CCE indexes, which are used for the transmission of the N repeated PDCCHs, may be defined as the corresponding $n_{CCE}$ value.

However, the method of defining the $n_{CCE}$ value described above may be applied, in the same manner, to the method for defining the corresponding $n_{CCE}$ value to be applied to the equations (1) and (2) in the case of reusing the PUCCH resource start offset value $N_{PUCCH}^{(1)}$ in the equation for the existing LTE/LTE-A terminal without defining a new PUCCH resource start offset for the MTC terminal as shown in FIG. 2 or FIG. 3 for the PUCCH resource mapping for the MTC terminal.

Embodiment 2. PUCCH Resource Allocation to Downlink Allocation DCI

Figure 5:
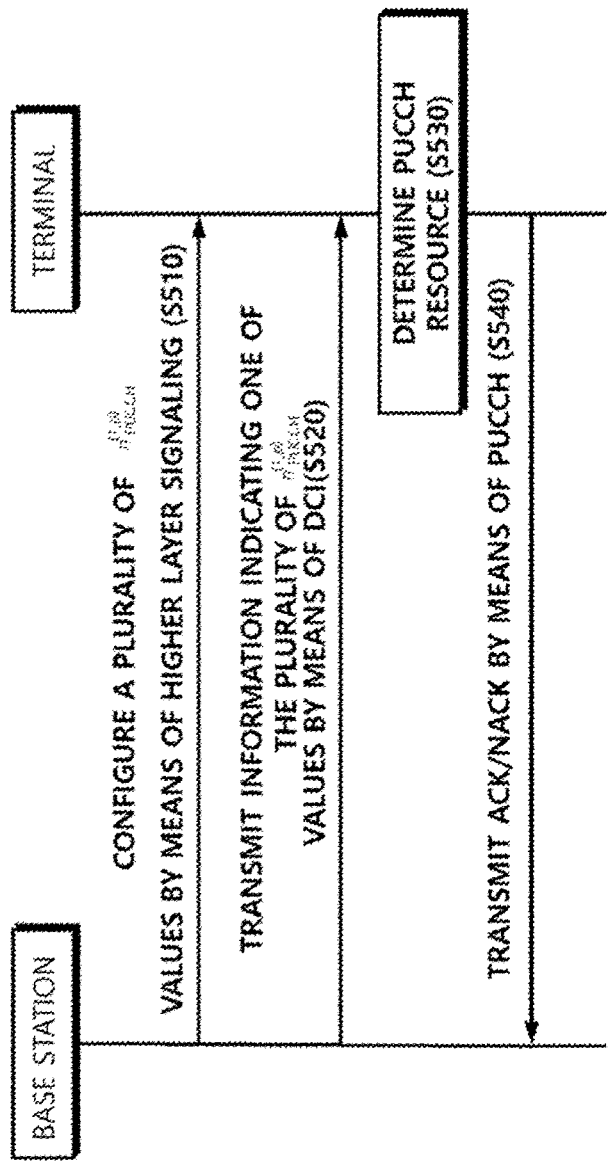
FIG. 5 is a flowchart illustrating a method according to a second embodiment of the present disclosure.

FIG. 5 is a flowchart illustrating a method according to a second embodiment of the invention.

Referring to FIG. 5, the base station may: pre-configure a candidate PUCCH resource value for a HARQ ACK/NACK feedback of the corresponding MTC terminal for each MTC terminal by the higher layer signaling as shown in Table 1 below (S510); define a PUCCH resource indicator field for indicating PUCCH resources to be used among the corresponding candidate PUCCH resource values by the downlink allocation DCI; and directly signal the same to the terminal (S520). The terminal determines the PUCCH resource (S530), and transmits the HARQ ACK/NACK to the base station through the PUCCH of the determined resource (S540).

At this time, the number of candidate PUCCH resources may be determined according to the size of the PUCCH resource indicator field of the downlink allocation DCI. For example, if the corresponding PUCCH resource indicator field is 2 bits, four candidate PUCCH resource values may be configured by the higher layer signaling for the corresponding candidate PUCCH resource configuration. Therefore, the terminal may map the PUCCH resource value for transmitting the HARQ ACK/NACK feedback among the four PUCCH resource values according to a configuration value of the PUCCH resource indicator field that is contained in the downlink allocation DCI as shown in Table 1 below. Here, the PUCCH resource indicator field may be newly defined, or some of the information area contained in the downlink allocation may be utilized as the PUCCH resource indicator. As an example of utilizing the existing information area, the TPC command information area of 2 bits may be utilized for the PUCCH resource indicator.

TABLE 1

| PUCCH resource indicator value in downlink allocation DCI | $n_{PUCCH}^{(1,\tilde{p})}$ |
|---|---|
| '00' | First PUCCH resource value configured by higher layer |
| '01' | Second PUCCH resource value configured by higher layer |
| '01' | Third PUCCH resource value configured by higher layer |
| '11' | Fourth PUCCH resource value configured by higher layer |

In addition, each candidate PUCCH resource value may include the number of PUCCH repetitions. That is, the number of times in which the HARQ ACK/NACK feedback is repeatedly transmitted through the PUCCH resource over the uplink subframes may be configured for each PUCCH resource value, as well as the PUCCH resources to be used for the HARQ ACK/NACK feedback.

Embodiment 3. ACK Resource Offset for MTC

Figure 6:
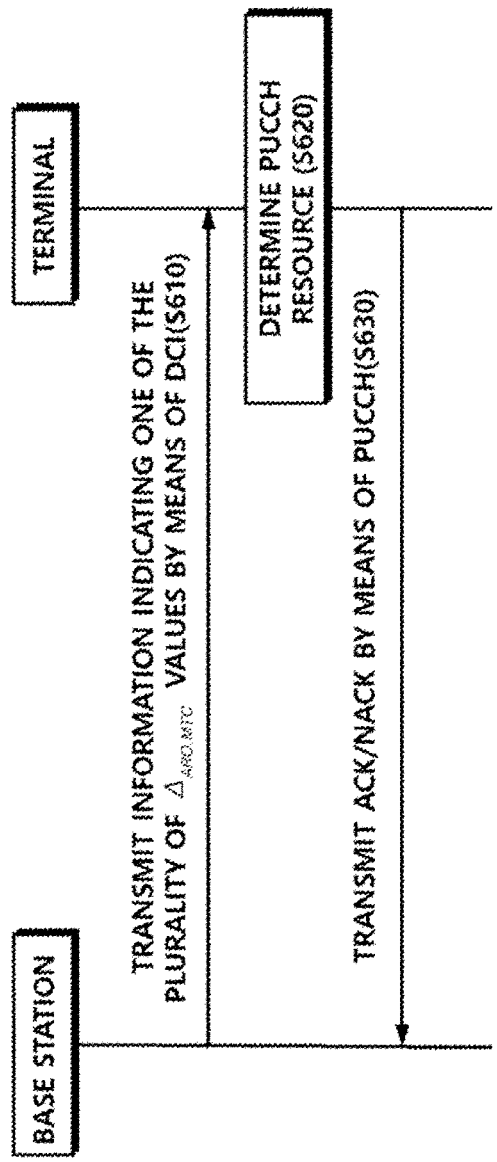
FIG. 6 is a flowchart illustrating a method according to a third embodiment of the present disclosure.

FIG. 6 is a flowchart illustrating a method according to a third embodiment of the invention.

In the present embodiment, an additional ACK resource offset parameter $\Delta_{ARO,MTC}$ for the MTC terminal may be defined and applied to the PUCCH resource mapping equation. That is, an ACK Resource Offset (ARO) information area indicates the PUCCH resource offset value. The ARO information area may be additionally defined in the downlink allocation for a certain MTC terminal, and the $\Delta_{ARO,\ MTC}$ value to be applied to the PUCCH resource mapping equation for the certain MTC terminal may be signaled to the terminal (S610). The terminal determines the PUCCH resource (S620) and transmits the HARQ ACK/NACK to the base station through the PUCCH of the determined resource (S630).

The $\Delta_{ARO,MTC}$ value according to the configuration value of the ARO in the downlink allocation DCI format may be defined such that a specific and fixed $\Delta_{ARO,MTC}$ value corresponds to each ARO value according to the table mapping method as shown in Table 2, or the base station may configure the $\Delta_{ARO,MTC}$ value for each ARO value and may signal the same to the MTC terminal.

TABLE 2

| ACK/NACK resource offset field in DCI format 1A/1B/1D/1/2A/2/2B/2C/2D | $\Delta_{ARO,MTC}$ |
|---|---|
| 0 | 0 |
| 1 | −1 |
| 2 | −2 |
| 3 | 2 |

According to this, equations (5) and (6) below may be applied instead of the existing PUCCH resource mapping equations (1) and (2) or the equations (3) and (4) for the terminal that receives the downlink allocation DCI through the PDCCH.

$$n_{PUCCH}^{(1,\tilde{p}0)}=n_{CCE}+N_{PUCCH,MTC}^{(1)}+\Delta_{ARO,MTC} \quad (5)$$

$$n_{PUCCH}^{(1,\tilde{p}1)}=n_{CCE}+1+N_{PUCCH,MTC}^{(1)}+\Delta_{ARO,MTC} \quad (6)$$

In accordance with at least one embodiment of the present disclosure, the PUCCH resource mapping rule has been suggested for the MTC terminal. However, the PUCCH for the DL HARQ ACK feedback of a certain MTC terminal may be repeatedly transmitted through a plurality of uplink subframes for the coverage enhancement as well.

In this case, the PUCCH resource for the DL HARQ ACK feedback in one uplink subframe is determined according to the method suggested above, and the DL HARQ ACK feedback may be defined to be repeatedly transmitted through the same PUCCH resource that is determined by the above-described methods in a plurality of uplink subframes according to the number of the repeated PUCCH transmissions.

In addition, although the present disclosure does not show a detailed embodiment about the number of PUCCH repetitions for the HARQ ACK/NACK feedback of the MTC terminal, it is obvious that the embodiments suggested above may be applied in the same manner regardless of the number of PUCCH repetitions.

Figure 7:
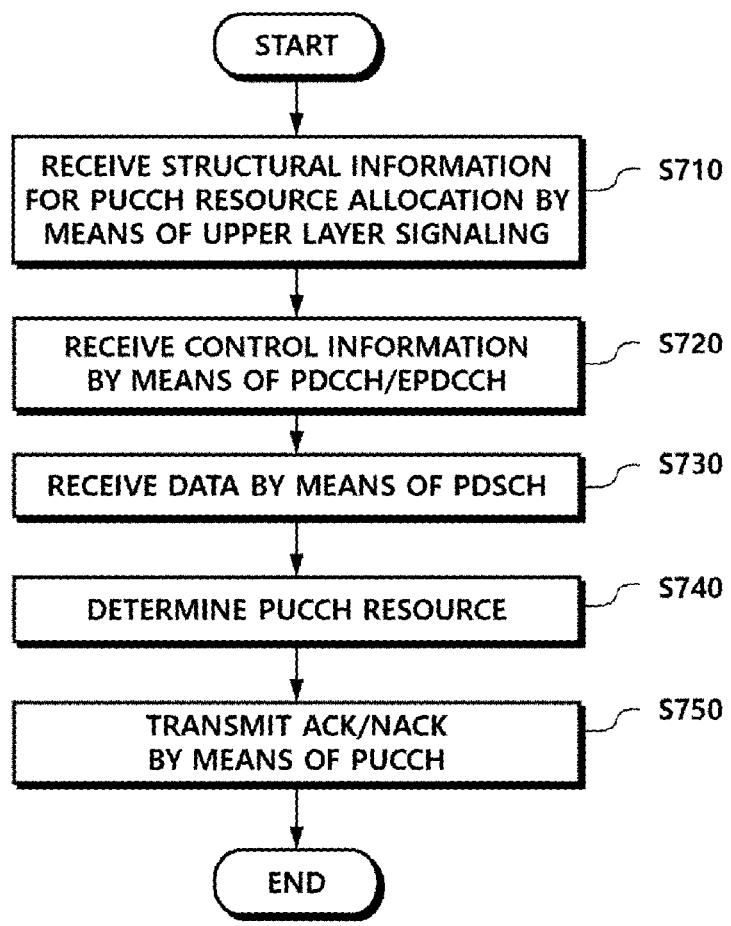
FIG. 7 is a flowchart illustrating a PUCCH transmission method of a terminal, according to an embodiment of the present disclosure.

FIG. 7 is a flowchart illustrating a PUCCH transmission method of the terminal, according to an embodiment of the present disclosure.

Referring to FIG. 7, the terminal receives, from the base station, structural information for the PUCCH resource allocation through the higher layer (for example, the RRC) signaling (S710).

The terminal receives the DCI for the downlink allocation by the PDCCH or EPDCCH from the base station (S720).

The terminal receives, from the base station, data by the PDSCH based on the scheduling information in the DCI (S730).

The terminal determines the resource ($n_{PUCCH}^{(1,\tilde{p})}$) of the PUCCH in which the HARQ ACK/NACK of the data received through the PDSCH is transmitted (S740).

In one example, the terminal may receive structural information that contains the PUCCH resource start offset parameter $N_{PUCCH,MTC}^{(1)}$ for the MTC terminal in operation S710, and the terminal may determine the resource ($n_{PUCCH}^{(1,\tilde{p})}$) of the PUCCH by using the equations (3) and (4) in operation S740. Alternatively, the terminal may: receive structural information that contains a plurality of PUCCH resource start offset parameters $N_{PUCCH,MTC}^{(1)}$ for the MTC terminal in operation S710; receive control information that indicates one of the plurality of parameters $N_{PUCCH,MTC}^{(1)}$ in operation S720; and determine the resource ($n_{PUCCH}^{(1,\tilde{p})}$) of the PUCCH by using the equations (3) and (4) in operation S740.

In another example, the terminal may: receive structural information that contains a plurality of PUCCH resource start offset parameters $n_{PUCCH}^{(1,\tilde{p})}$ for the MTC terminal in operation S710; receive control information that indicates one of the plurality of parameters $n_{PUCCH}^{(1,\tilde{p})}$ in operation S720; and determine the resource ($n_{PUCCH}^{(1,\tilde{p})}$) of the PUCCH based on the control information in operation S740.

In another example, the terminal may receive control information that indicates one of a plurality of ACK resource offsets $\Delta_{ARO,MTC}$ in operation S720, and may determine the resource ($n_{PUCCH}^{(1,\tilde{p})}$) of the PUCCH by using the equations (5) and (6) in operation S740. At this time, the plurality of ACK resource offsets $\Delta_{ARO,MTC}$ may be pre-configured or may be transmitted from the base station to the terminal in operation S710.

When the PDCCH or EPDCCH is repeatedly transmitted through a plurality of subframes and when using the equations (3) and (4) or the equations (5) and (6), the lowest CCE index ($ncc_E$), in which the PDCCH or EPDCCH is transmitted, may be (i) the lowest CCE index that has been used for the transmission of the first PDCCH or EPDCCH, (ii) the lowest CCE index that has been used for the transmission of the last PDCCH or EPDCCH, or (iii) the minimum value among the lowest CCE indexes that have been used for the transmission of the PDCCH or EPDCCH.

The terminal transmits, to the base station, the HARQ ACK/NACK of the data that is received through the PDSCH by using the resource ($n_{PUCCH}^{(1,\tilde{p})}$) of the determined PUCCH (S750).

Although operation S740 and operation S750 have been described as being performed separately from each other, the operations may be performed in a single operation. That is, response information on the downlink data may be transmitted by using the resource of the uplink control channel, which is determined based on at least one piece of information on the resource of the downlink control channel for scheduling the downlink data, information on the resource to which the uplink control channel is allocated, or offset information of the resource to which the uplink control channel is allocated.

Figure 8:
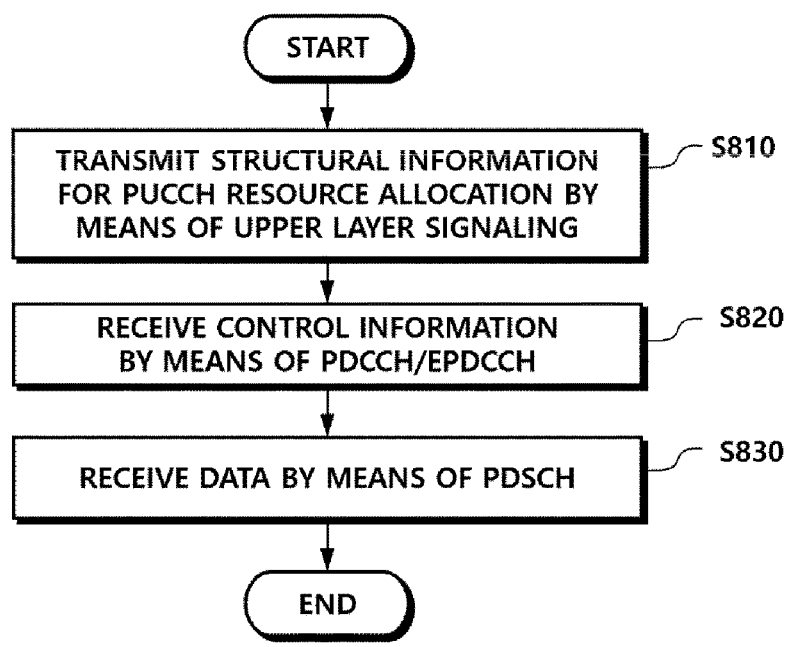
FIG. 8 is a flowchart illustrating a PUCCH configuration method of a base station, according to an embodiment of the present disclosure.

FIG. 8 is a flowchart illustrating a PUCCH resource configuration method of the base station, according to an embodiment of the present disclosure.

Referring to FIG. 8, the base station transmits structural information for the PUCCH resource allocation to the terminal by higher layer signaling (e.g., RRC signaling) (S810).

The base station transmits the DCI for the downlink allocation to the terminal by the PDCCH or EPDCCH (S820).

In addition, the base station transmits data to the terminal by the PDSCH (S830).

In one example, the base station may transmit structural information that contains the PUCCH resource start offset parameter $N_{PUCCH,MTC}^{(1)}$ for the MTC terminal in operation S810, and the terminal may determine the resource ($n_{PUCCH}^{(1,\tilde{p})}$) of the PUCCH by using the equations (3) and (4). Alternatively, the base station may transmit structural information that contains a plurality of PUCCH resource start offset parameters $N_{PUCCH,MTC}^{(1)}$ for the MTC terminal in operation S810 and may transmit control information that indicates one of the plurality of parameters $N_{PUCCH,MTC}^{(1)}$ in operation S820, and the terminal may determine the resource ($n_{PUCCH}^{(1,\tilde{p})}$) of the PUCCH by using the equations (3) and (4).

In another example, the base station may transmit structural information that contains a plurality of PUCCH resource start offset parameters $n_{PUCCH}^{(1,\tilde{p})}$ for the MTC terminal in operation S810, and the base station may transmit control information that indicates one of the plurality of parameters $n_{PUCCH}^{(1,\tilde{p})}$ in operation S820, and the terminal may determine the resource ($n_{PUCCH}^{(1,\tilde{p})}$) of the PUCCH based on the control information.

In another example, the base station may transmit control information that indicates one of a plurality of ACK resource offsets $\Delta_{ARO,MTC}$ in operation S820, and the terminal may determine the resource ($n_{PUCCH}^{(1,\tilde{p})}$) of the PUCCH by using the equations (5) and (6). At this time, the plurality of ACK resource offsets $\Delta_{ARO,MTC}$ may be pre-configured or may be transmitted from the base station to the terminal in operation S810.

When the PDCCH or EPDCCH is repeatedly transmitted through a plurality of subframes and when using the equations (3) and (4) or the equations (5) and (6), the lowest CCE index ($n_{CCE}$), in which the PDCCH or EPDCCH is transmitted, may be (i) the lowest CCE index that has been used for the transmission of the first PDCCH or EPDCCH, (ii) the lowest CCE index that has been used for the transmission of the last PDCCH or EPDCCH, or (iii) the minimum value among the lowest CCE indexes that have been used for the transmission of the PDCCH or EPDCCH.

Figure 9:
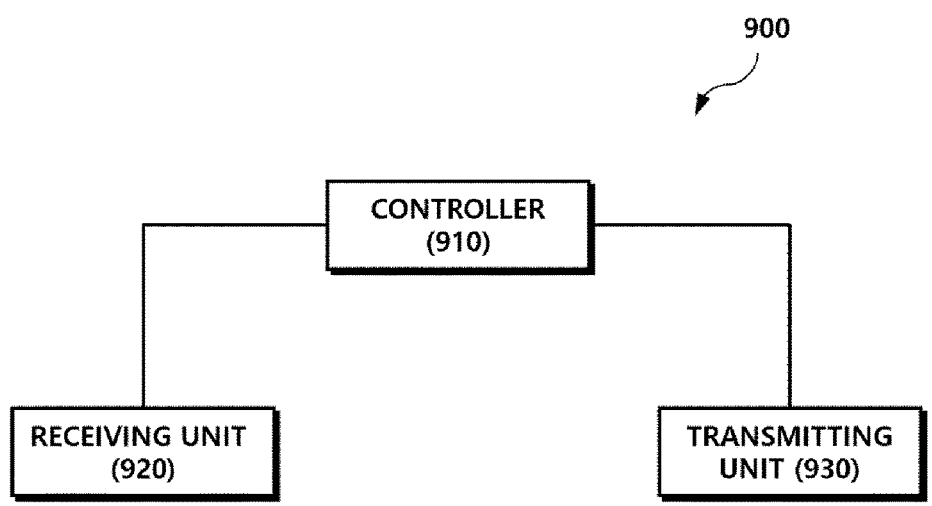
FIG. 9 is a block diagram showing a configuration of a terminal, according to an embodiment of the present disclosure.

FIG. 9 is a block diagram showing a configuration of a terminal, according to an embodiment of the present disclosure.

Referring to FIG. 9, the terminal 900, according to an embodiment of the present disclosure, includes a controller 910, a receiving unit 920, and a transmitting unit 930.

The receiving unit 920 may receive, from the base station, the structural information for the PUCCH resource allocation through the higher layer (for example, RRC) signaling.

In addition, the receiving unit 920 may receive the DCI for the downlink allocation by the PDCCH or EPDCCH from the base station, and the receiving unit 920 may receive the data through the PDSCH based on the scheduling information in the DCI.

The controller 910 may determine the resource ($n_{PUCCH}^{(1,\tilde{p})}$) of the PUCCH in which the HARQ ACK/NACK of the data received through the PDSCH is transmitted.

The transmitting unit 930 may transmit the HARQ ACK/NACK of the data received through the PDSCH to the base station by using the determined resource (($n_{PUCCH}^{(1,\tilde{p})}$) of the PUCCH.

In one example, the receiving unit 920 may receive the structural information that contains the PUCCH resource start offset parameter $N_{PUCCH,MTC}^{(1)}$ for the MTC terminal, and the controller 930 may determine the resource ($n_{PUCCH}^{(1,\tilde{p})}$) of the PUCCH by using the equations (3) and (4). Alternatively, the receiving unit 920 may receive the structural information that contains a plurality of PUCCH resource start offset parameters $N_{PUCCH,MTC}^{(1)}$ for the MTC terminal, and the receiving unit 920 may receive the control information that indicates one of the plurality of parameters $N_{PUCCH,MTC}^{(1)}$ and the controller 910 may determine the resource ($n_{PUCCH}^{(1,\tilde{p})}$) of the PUCCH by using the equations (3) and (4).

In another example, the receiving unit 920 may receive the structural information that contains a plurality of PUCCH resource start offset parameters $n_{PUCCH}^{(1,p)}$ for the MTC terminal, and the receiving unit 920 may receive the control information that indicates one of the plurality of parameters $n_{PUCCH}^{(1,p)}$, and the controller 910 may determine the resource ($n_{PUCCH}^{(1,\tilde{p})}$) of the PUCCH based on the control information.

In another example, the receiving unit 920 may receive the control information that indicates one of a plurality of ACK resource offsets $\Delta_{ARO,MTC}$, and the controller 910 may determine the resource ($n_{PUCCH}^{(1,\tilde{p})}$) of the PUCCH by using the equations (5) and (6). At this time, the plurality of ACK resource offsets $\Delta_{ARO,MTC}$ may be pre-configured or may be transmitted from the base station to the terminal through the higher layer signaling.

When the PDCCH or EPDCCH is repeatedly transmitted through a plurality of subframes and when using the equations (3) and (4) or the equations (5) and (6), the lowest CCE index ($n_{CCE}$), in which the PDCCH or EPDCCH is transmitted, may be (i) the lowest CCE index that has been used for the transmission of the first PDCCH or EPDCCH, (ii) the lowest CCE index that has been used for the transmission of the last PDCCH or EPDCCH, or (iii) the minimum value among the lowest CCE indexes that have been used for the transmission of the PDCCH or EPDCCH.

Figure 10:
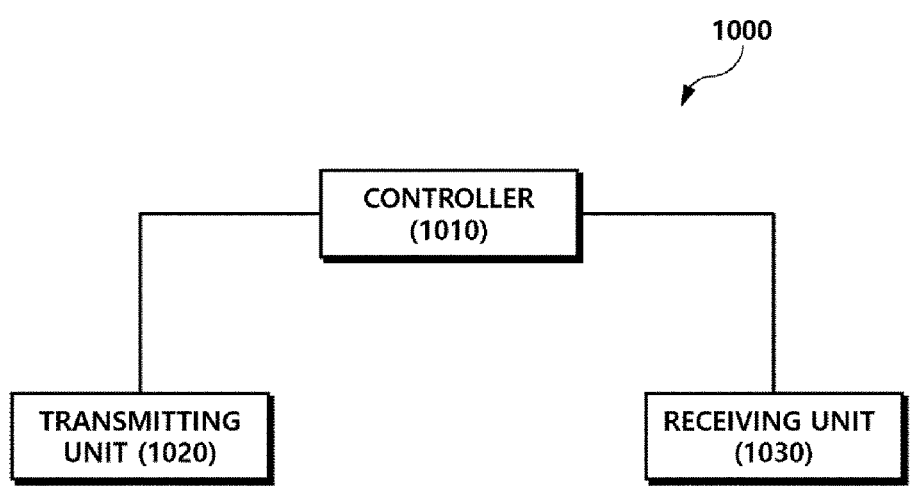
FIG. 10 is a block diagram showing a configuration of a base station, according to an embodiment of the present disclosure.

FIG. 10 is a block diagram showing a configuration of a base station, according to an embodiment of the present disclosure.

Referring to FIG. 10, the base station 1000, according to an embodiment of the present disclosure, includes a controller 1010, a transmitting unit 1020, and a receiving unit 1030.

The controller 1010 controls the overall operations of the base station in relation to the PUCCH resource allocation for the uplink HARQ ACK/NACK feedback of the MTC terminal, which are necessary to perform the invention described above.

The transmitting unit 1020 may transmit the structural information for the PUCCH resource allocation to the terminal by the higher layer signaling (e.g., RRC) signaling.

In addition, the transmitting unit 1020 may transmit the DCI for the downlink allocation to the terminal by the PDCCH or EPDCCH, and the transmitting unit 1020 may transmit data by means of the PDSCH.

The receiving unit 1030 may receive the ACK/NACK for the PDSCH from the terminal through the PUCCH.

In one example, the transmitting unit 1020 may transmit the structural information that contains the PUCCH resource start offset parameter $N_{PUCCH,MTC}^{(1)}$ for the MTC terminal, and the terminal may determine the resource ($n_{PUCCH}^{(1,\tilde{p})}$) of the PUCCH by using the equations (3) and (4). Alternatively, the transmitting unit 1020 may transmit the structural information that contains a plurality of PUCCH resource start offset parameters $N_{PUCCH,MTC}^{(1)}$ for the MTC terminal, and the transmitting unit 1020 may transmit the control information that indicates one of the plurality of parameters $N_{PUCCH,MTC}^{(1)}$, and the terminal may determine the resource ($n_{PUCCH}^{(1,\tilde{p})}$) of the PUCCH by using the equations (3) and (4).

In another example, the transmitting unit 1020 may transmit the structural information that contains a plurality of PUCCH resource start offset parameters $n_{PUCCH}^{(1,p)}$ for the MTC terminal, and the transmitting unit 1020 may transmit the control information that indicates one of the plurality of parameters $n_{PUCCH}^{(1,p)}$, and the terminal may determine the resource ($n_{PUCCH}^{(1,\tilde{p})}$) of the PUCCH based on the control information.

In another example, the transmitting unit 1020 may transmit the control information that indicates one of a plurality of ACK resource offsets $\Delta_{ARO,MTC}$, and the terminal may determine the resource ($n_{PUCCH}^{(1,\tilde{p})}$) of the PUCCH by using the equations (5) and (6). At this time, the plurality of ACK resource offsets $\Delta_{ARO,MTC}$ may be pre-configured or may be transmitted from the base station to the terminal in operation S810.

When the PDCCH or EPDCCH is repeatedly transmitted through a plurality of subframes and when using the equations (3) and (4) or the equations (5) and (6), the lowest CCE index ($n_{CCE}$), in which the PDCCH or EPDCCH is transmitted, may be (i) the lowest CCE index that has been used for the transmission of the first PDCCH or EPDCCH, (ii) the lowest CCE index that has been used for the transmission of the last PDCCH or EPDCCH, or (iii) the minimum value among the lowest CCE indexes that have been used for the transmission of the PDCCH or EPDCCH.

The description of the reference content or reference documents mentioned above have been omitted in order to simplify the description of the specification, and shall constitute a part of the present specification. Therefore, the partial description of the reference content or reference documents, which may be added to the present specification or claims, should be interpreted to be included within the scope of the invention.

The description above has been made to provide only examples of the technical concept of the present disclosure, and it may be possible for those skilled in the art to make various modifications and changes without departing from the essential subject matter of the present disclosure. Therefore, the embodiments described herein are only for explaining, and are not intended to limit, the technical concept of the present disclosure, and the scope of the present disclosure is not limited thereto. The scope of the invention should be construed by the following claims, and all techniques equivalent to the same should be construed as being included in the scope of the invention.

The invention claimed is:

1. A method of transmitting response information of downlink data of a Machine Type Communication (MTC) terminal, the method comprising:
   receiving structural information that contains at least one of i) information on a resource allocated to an uplink control channel for transmitting the response information and ii) start offset information on the resource allocated to the uplink control channel;
   receiving downlink control information for scheduling the downlink data;
   receiving the downlink data; and
   transmitting the response information on the downlink data by using the resource allocated to the uplink control channel,
   wherein the resource allocated to the uplink control channel is determined based on at least one of: i) information on a resource of a downlink control channel for scheduling the downlink data; ii) the information on the resource allocated to the uplink control channel; and iii) the start offset information on the resource allocated to the uplink control channel;
   wherein the start offset information of the resource allocated to the uplink control channel is configured separated from start offset information for a terminal different from the MTC terminal;
   wherein a plurality of pieces of start offset information of the resource allocated to the uplink control channel are provided, and the plurality of pieces of start offset information are received through cell-specific high layer signaling for the MTC terminal from a base station;
   wherein the start offset information on the resource allocated to the uplink control channel is determined based on a coverage level; and
   wherein when the response information of the downlink data of the MTC terminal is repeatedly transmitted, the repeated transmission is performed using a same uplink control channel resource in each uplink subframe in which the uplink control channel is repeatedly transmitted.

2. The method of claim 1, wherein:
   at least one of the plurality of pieces of start offset information is applied according to a corresponding coverage level of the MTC terminal.

3. A method of configuring a resource of response information of downlink data for a Machine Type Communication (MTC) terminal in a base station, the method comprising:
   transmitting structural information that contains at least one of i) information on a resource allocated to an uplink control channel for transmitting the response information and ii) start offset information on the resource allocated to the uplink control channel;
   transmitting downlink control information for scheduling the downlink data; and
   transmitting the downlink data,
   wherein the resource of the uplink control channel for transmitting the response information of the downlink data is determined based on at least one piece of information on i) a resource of a downlink control channel for scheduling the downlink data; ii) the information on the resource allocated to the uplink control channel; and iii) the start offset information on the resource allocated to the uplink control channel;
   wherein the start offset information of the resource allocated to the uplink control channel is configured separated from offset information on a terminal different from the MTC terminal;
   wherein a plurality of pieces of start offset information on the resource allocated to the uplink control channel are provided, and the plurality of pieces of start offset information are transmitted through cell-specific high layer signaling for the MTC terminal to the MTC terminal;
   wherein the start offset information on the resource allocated to the uplink control channel is determined based on a coverage level; and
   wherein when the response information of the downlink data of the MTC terminal is repeatedly transmitted, the repeated transmission is performed using a same uplink control channel resource in each uplink subframe in which the uplink control channel is repeatedly transmitted.

4. The method of claim 3, wherein:
   at least one of the plurality of pieces of start offset information is applied according to a corresponding coverage level of the MTC terminal.

5. A Machine Type Communication (MTC) terminal for transmitting response information of downlink data to a base station, the terminal comprising:
   a receiving unit configured to receive structural information that contains at least one piece of i) information on a resource allocated to an uplink control channel for transmitting the response information and ii) start offset information on the resource to which the uplink control channel is allocated, configured to receive downlink control information for scheduling the downlink data, and configured to receive the downlink data;
   a controller configured to determine a resource allocated to the uplink control channel for transmitting the response information of the downlink data based on at least one of i) information on a resource of a downlink control channel for scheduling the downlink data, ii) the information on the resource allocated to the uplink control channel, and iii) the start offset information on the resource allocated to the uplink control channel; and
   a transmitting unit configured to transmit the response information of the downlink data by using the determined resource of the uplink control channel, wherein the start offset information of the resource allocated to the uplink control channel is configured separated from offset information on a terminal different from the MTC terminal;

wherein a plurality of pieces of start offset information on the resource allocated to the uplink control channel are provided, and the plurality of pieces of start offset information are received through cell-specific high layer signaling for the MTC terminal from the base station;

wherein the start offset information on the resource allocated to the uplink control channel is determined based on a coverage level; and wherein when the response information of the downlink data of the MTC terminal is repeatedly transmitted, the repeated transmission is performed using a same uplink control channel resource in each uplink subframe in which the uplink control channel is repeatedly transmitted.

6. The MTC terminal of claim 5, wherein:

at least one of the plurality of pieces of start offset information is applied according to a corresponding coverage level of the MTC terminal.

7. A base station for configuring a resource of response information of downlink data for a Machine Type Communication (MTC) terminal, the base station comprising:

a transmitting unit configured to transmit structural information, downlink control information for scheduling the downlink data, and the downlink data, wherein the structural information contains at least one piece of i) information on a resource allocated to an uplink control channel for transmitting the response information and ii) start offset information on the resource allocated to the uplink control channel;

wherein the resource of the uplink control channel for transmitting the response information of the downlink data is determined based on at least one piece of i) information on a resource of a downlink control channel for scheduling the downlink data, ii) the information on the resource allocated to the uplink control channel, and iii) the start offset information of the resource allocated to the uplink control channel;

wherein the start offset information of the resource allocated to the uplink control channel is configured separated from offset information on a terminal different from the MTC terminal;

wherein a plurality of pieces of start offset information on the resource allocated to the uplink control channel are provided, and the plurality of pieces of start offset information are transmitted through cell-specific high layer signaling for the MTC terminal to the MTC terminal;

wherein the start offset information of the resource allocated to the uplink control channel is determined based on a coverage level; and wherein when the response information of the downlink data of the MTC terminal is repeatedly transmitted, the repeated transmission is performed using a same uplink control channel resource in each uplink subframe in which the uplink control channel is repeatedly transmitted.

* * * * *